US008634820B1

(12) United States Patent
Ricket

(10) Patent No.: US 8,634,820 B1
(45) Date of Patent: Jan. 21, 2014

(54) SYSTEM AND METHODS FOR ENABLING WIFI HOTSPOT

(71) Applicant: Silicon Valley Technology Partners, Saratoga, CA (US)

(72) Inventor: Douglas James Ricket, Saratoga, CA (US)

(73) Assignee: Silicon Valley Technology Partners, Saratoga, CA (US)

( * ) Notice: Subject to any disclaimer, the term of this patent is extended or adjusted under 35 U.S.C. 154(b) by 0 days.

(21) Appl. No.: 13/860,100

(22) Filed: Apr. 10, 2013

Related U.S. Application Data

(60) Provisional application No. 61/669,075, filed on Jul. 8, 2012.

(51) Int. Cl.
  *H04M 3/00* (2006.01)
(52) U.S. Cl.
  USPC ...................................... 455/418; 379/201.04
(58) Field of Classification Search
  USPC ........... 455/405, 411, 414.1–414.3, 418–420, 455/435.1–435.3, 466; 379/201.01–218.02
  See application file for complete search history.

(56) References Cited

U.S. PATENT DOCUMENTS

| 5,794,142 | A | * | 8/1998 | Vanttila et al. | ................. 455/419 |
|---|---|---|---|---|---|
| 6,023,620 | A | * | 2/2000 | Hansson | ........................ 455/419 |
| 6,029,065 | A | * | 2/2000 | Shah | .......................... 455/414.4 |
| 2004/0205164 | A1 | * | 10/2004 | Jacobs et al. | .................. 709/219 |
| 2012/0106726 | A1 | * | 5/2012 | Hillier et al. | ............. 379/201.04 |
| 2013/0182693 | A1 | * | 7/2013 | Sperling et al. | ............... 370/338 |

* cited by examiner

*Primary Examiner* — Kashif Siddiqui
(74) *Attorney, Agent, or Firm* — Courtney IP Law; Barbara A. Courtney

(57) ABSTRACT

A system and methods for enabling a disabled mobile device feature are disclosed. According to an embodiment, device information regarding a mobile device is collected. Based on the device information, a search is performed for a set of instructions to enable the device feature. A selected set of instructions is performed on the mobile device, and if execution fails to enable the feature, another set of instructions is selected and performed. The sets of instructions are continually updated and stored based on experience. In an embodiment, the method is performed with a mobile application on a mobile phone. The mobile application includes a user interface to allow the user to access and use disabled or hidden features of the mobile phone.

24 Claims, 8 Drawing Sheets

SYSTEM AND METHODS FOR ENABLING WIFI HOTSPOT

RELATED APPLICATIONS

This application claims the benefit of U.S. Provisional application Ser. No. 61/669,075, filed Jul. 8, 2012, which is incorporated by reference in its entirety herein.

BACKGROUND

Device manufacturers typically design wireless devices with many hardware capabilities, not all of which are used in the same way by different service providers. For example, service providers alter and customize mobile phone hardware and software to localize devices and their features for appropriate markets. However, this customization is also used to remove features that are native to the device. One example is removal of features that are native to the Android™ operating system on a mobile phone. The alteration of the Android™ operating system usually varies by device and by service provider. For example, service providers might alter the Android™ operating system source code in order to hide or mask certain features. Not all alterations achieve the same result for all devices or versions of the Android™ operating system. Therefore, different techniques are employed for different phone hardware sets and different service providers to achieve the same goals. As an example, a phone using the Android™ operating system typically has a wireless hotspot feature or capability, but the feature can be hidden or masked. That is, access to the feature is not apparent to a user of the device using the commands available. In some instances, the use of the feature may be limited in various ways by either the phone manufacturer or the wireless service provider. In some cases, the manufacturers remove the user interface to a WiFi hotspot. In other cases, they modify the system in order to place restrictions limiting the use of the WiFi hotspot.

FIG. 2A represents a wireless networks settings page found in the device settings options of a mobile device. As shown in FIG. 2A, this Android™ wireless networks settings page includes an option for the user to toggle the WiFi hotspot feature on and off (tethering+portable hotspot). This is an example of a device that does not have the WiFi capability masked, hidden or disabled. FIG. 2B represents the same wireless networks settings page with the Android™ source code altered to remove the WiFi hotspot feature and tethering options from the settings. FIG. 2C represents the same wireless networks settings page with a subscription permission prompt 203, indicating that the user cannot turn on the WiFi hotspot feature without a subscription for that service. It is desirable for a phone user to be able to use the full capabilities of the purchased device.

DETAILED DESCRIPTION

Embodiments of a method and system for enabling various features on a mobile device are described. Embodiments described herein allow a user to access the hotspot feature on various mobile devices according to various methods depending upon the way in which the hotspot feature is masked, hidden, or otherwise made unavailable. For purposes of illustrating the invention as claimed herein, a mobile phone is used as an example of a device. However, any device that has the capability of functioning as a wireless communication hotspot can be part of the system as described.

In an embodiment, various features might not be accessible to a user of the mobile device when the phone is originally acquired as configured by one or more of the device manufacturer and the wireless service provider. For example, some mobile devices have the capability to act as wireless hotspots that other devices can tether to in order to wirelessly communicate. For example, the Android™ operating system added a "WiFi hotspot" feature that allows a device's WiFi system not just to connect to a WiFi access point, but to act as an access point and allow other devices to connect to it. Typically, an Android™ device that has a cellular modem data connection (for example, a 3G or 4G network) will share that Internet connection through its WiFi access point, allowing laptops, tablets, smart phones, and other devices to access the Internet. While various wireless communications protocols exist, WiFi is an example of a common wireless protocol that will be used in this document as an example of such a protocol. Any other wireless protocol is equally applicable to embodiments described. Any wireless capable device is applicable to embodiments described. Because a variety of alterations are made to devices in order to mask or hide features, various methods for making hidden features usable again are described herein.

Figure 1:
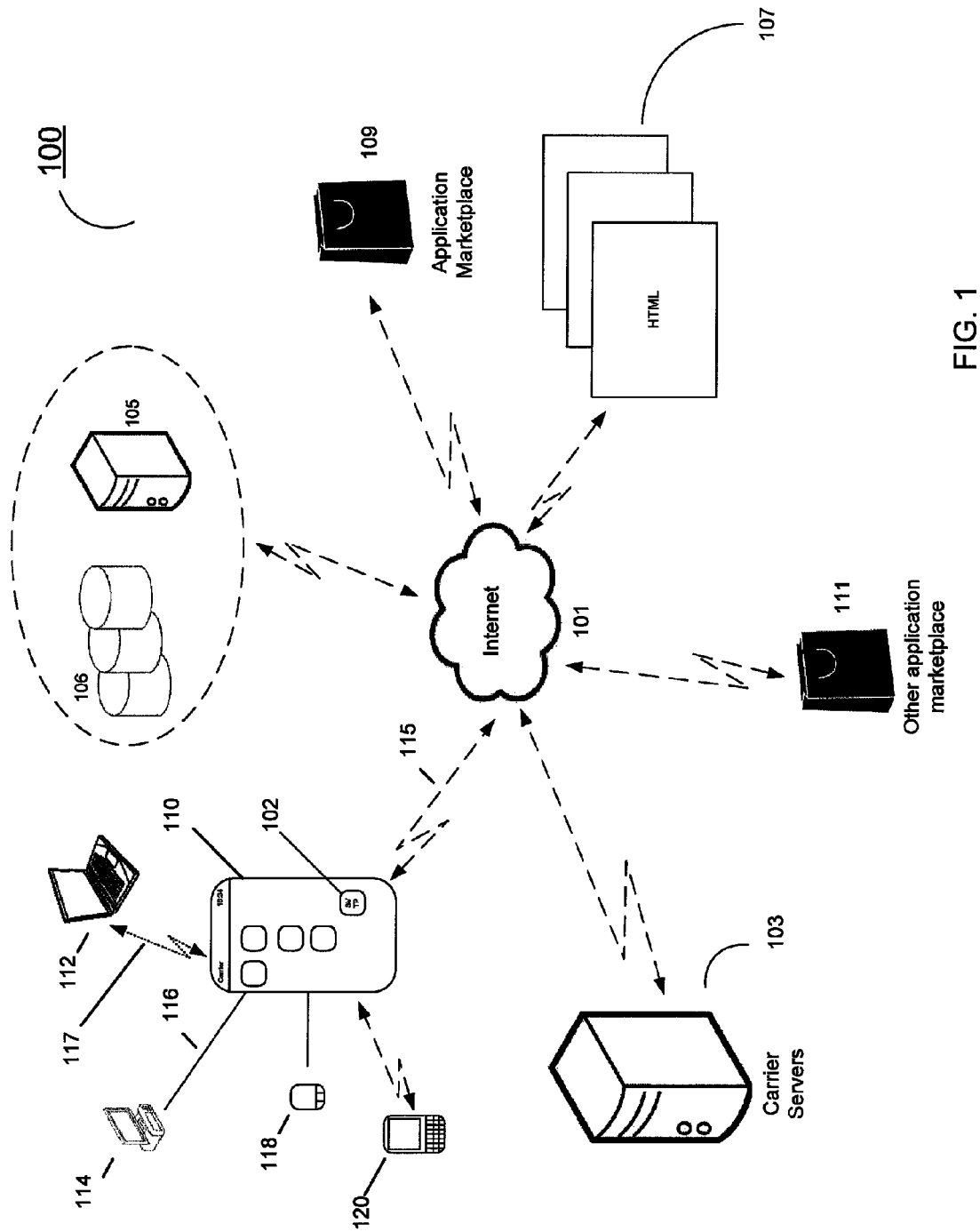
FIG. 1 is a block diagram of a wireless communication system according to an embodiment.

FIG. 1 is a diagram of a wireless communication system 100 according to an embodiment. System 100 includes a mobile device 110 wirelessly connected to the Internet 101. The mobile device 110 can then connect to servers 103, which are provided by Internet service providers. As used herein, Internet service providers include telecommunications carriers and any other providers of wireless communication capability to subscribers. Application databases 106 and servers 105 relate to a mobile application 102 that embodies the invention, and also store data related to mobile devices. Server 105 and databases 106 can reside anywhere, and be distributed in any fashion so long as they have access to the Internet 101. The databases 106 store a variety of data regarding application programming interface (API) instructions that are required to unlock features on Android™ devices. The data is specific to different devices and carriers. In an embodiment, the data regarding APIs and different devices is continually updated as different users use the mobile application 102 on different devices and with different carriers.

The data can be accessed through the Internet 101 for use on the mobile application 102 once the mobile application is downloaded to the mobile device 110. The mobile application 102 embodying the invention can be acquired through HTML websites 107, Google Play™ application marketplace 109, and other Android™ operating system application marketplaces 111 through the Internet 101. The mobile application 102 can be loaded on to mobile device 110 (typically from databases 106) in various ways. The application 102 can be downloaded to device 110 using device 110. The application 102 can be loaded by plugging in a flash memory card 118, or by connecting the mobile device 110 through a universal serial bus (USB) cable 116 to a personal computer (PC) 114 and transferring application 102 installation data through the PC operating system. Alternatively, the application 102 is downloaded by connecting wirelessly to a personal computer 112 or by connecting to a second mobile device 120 and transferring the application 102 installation data to the mobile device 110.

Figure 2:
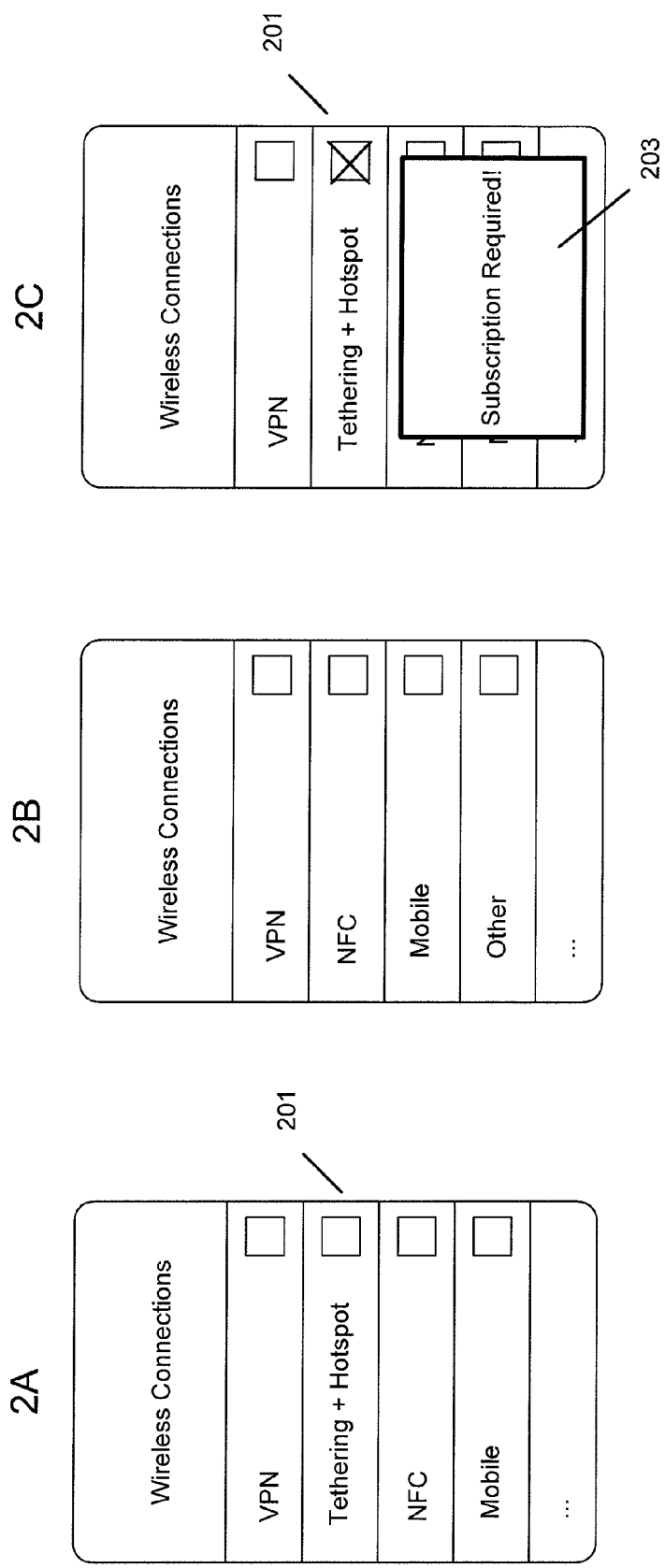
FIGS. 2A-2C represent Prior Art mobile device screens according to an embodiment.

In various embodiments, application 102 allows the user to access and enable a wireless hotspot feature of the device 110 that would not otherwise be accessible. FIG. 2 illustrates various device screens for an Android™ operating system device. Embodiments described below enable a user to access and activate the WiFi hotspot feature even if it not available as shown in FIGS. 2B and 2C.

Figure 3:
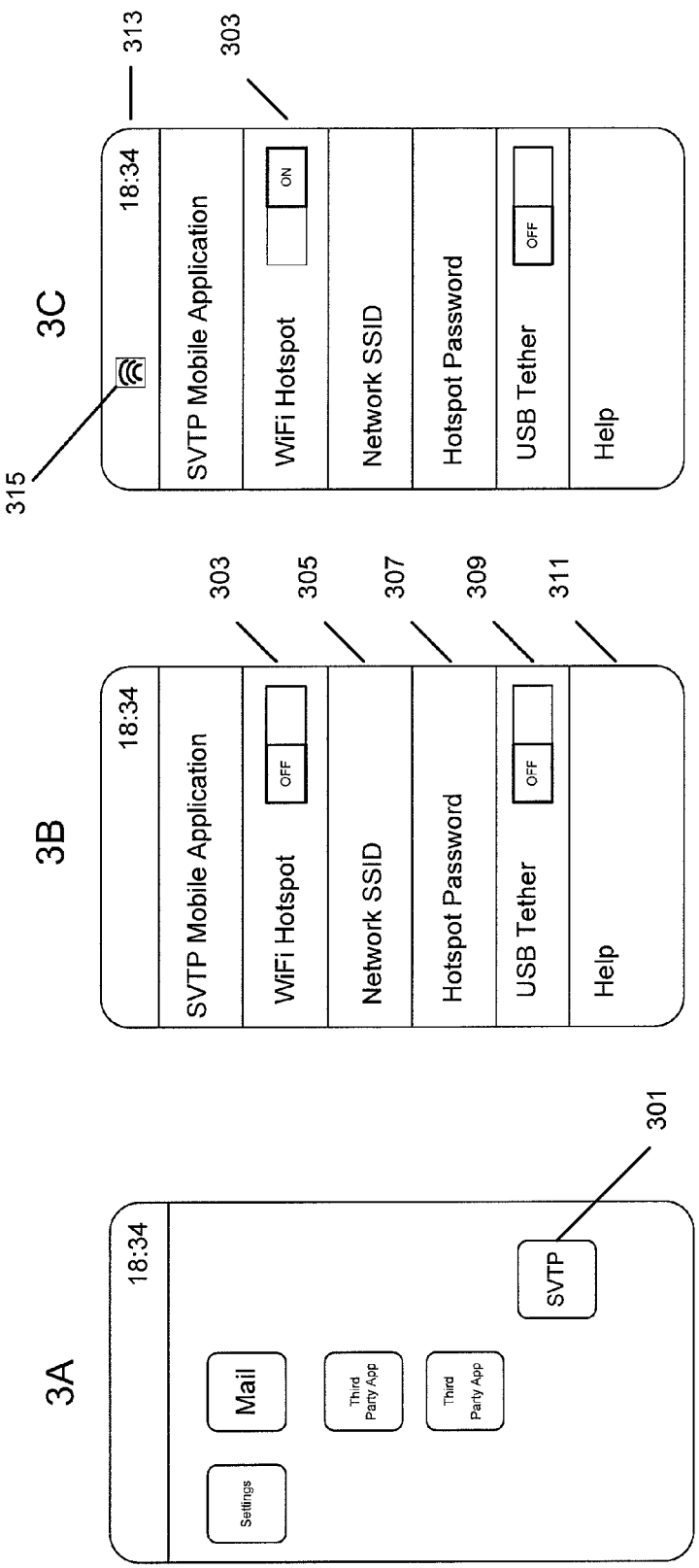
FIG. 3 represents mobile device screens according to an embodiment.

FIG. 3 illustrates various device screens of mobile application 102. FIG. 3 is an example of screens that appear for the user instead of, or as a replacement for, the hotspot feature settings page or pages as provided by the manufacturer and/or the service provider. In FIG. 3, the screens are shown as they appear when the application 102 has determined how to make the hotspot feature accessible and usable according to one of various processes described below.

FIG. 3A shows a home screen on the Android™ operating system running on mobile device 110. The various tiles on the home screen represent mobile applications or system applications. The mobile application 102 once downloaded on the mobile device 110 will appear as mobile application tile 301, which is arbitrarily labeled "SVTP" for reference herein. The mobile application 102 is accessed by pressing mobile application tile 301 from wherever it is on device 110. FIG. 3B is a screen shot of mobile application 102 once opened by the user by pressing tile 301. A WiFi hotspot toggle switch 303 allows the user to turn on or off the hotspot feature. The user can edit the name of their hotspot network by pressing the network identification (ID) 305 option and entering a new name. The user can also edit the network password 307 for their hotspot so only desired devices can connect to the hotspot. The mobile application 102 can also adjust wired data connections using the USB tethering toggle switch 309. For users who need assistance a help service 311 is located at the bottom. FIG. 3C demonstrates what the user interface looks like when the SVTP mobile application WiFi Hotspot toggle switch 303 is turned to the on position. Once the toggle switch 303 is turned to on and the WiFi hotspot is successfully created a WiFi logo 315 will appear in the Android™ Operating System status tray 313. The WiFi logo 315 will stay on as long as the mobile device 110 is broadcasting a WiFi signal that can be connected to.

Figure 4:
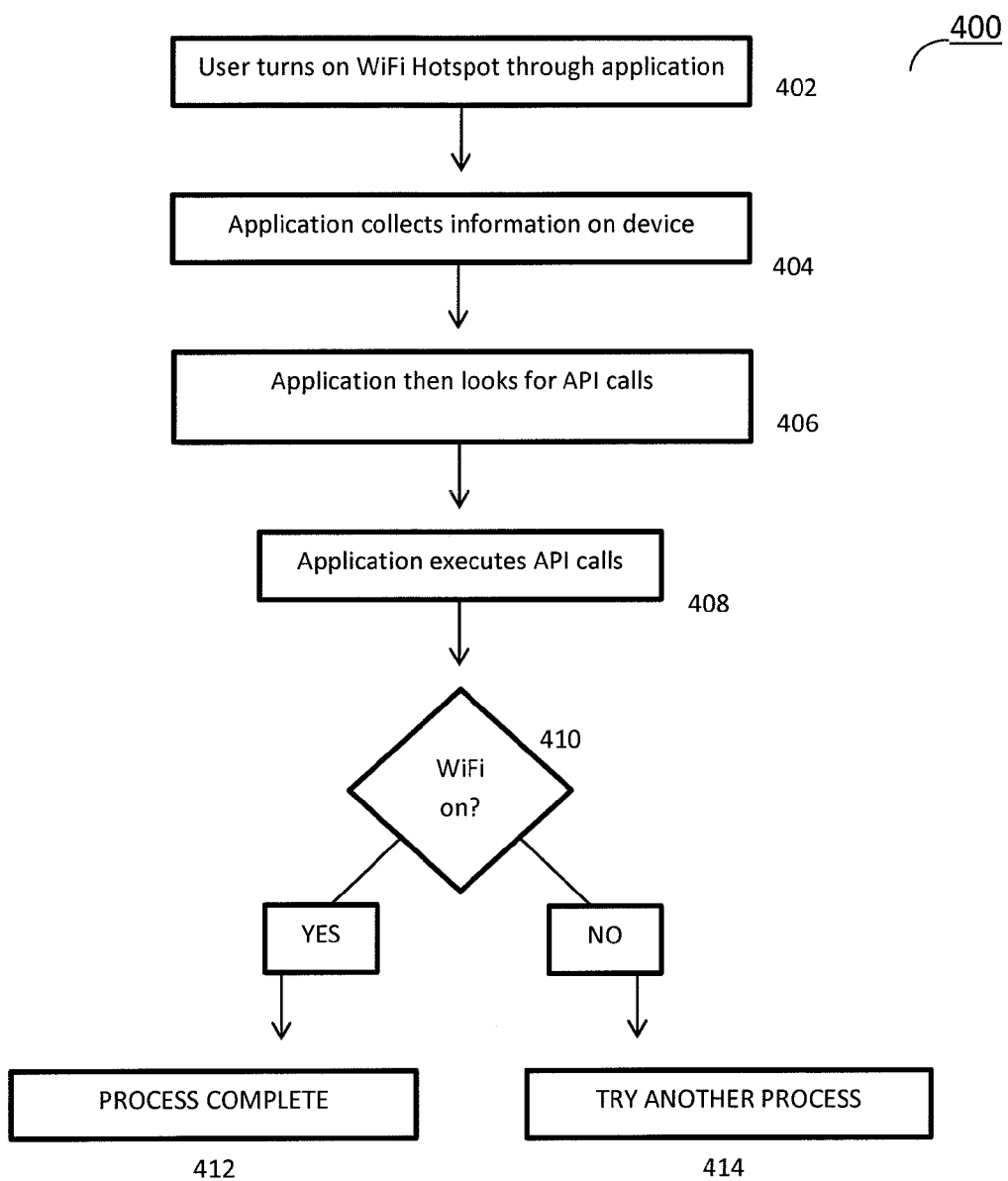
FIG. 4 is a flow diagram illustrating a method for accessing a wireless hotspot feature on a mobile device according to an embodiment.

FIG. 4 is a flow chart of a process 400 for revealing a hidden device feature according to an embodiment. The user turns on mobile application 102 as shown at 402. The mobile application 102 then collects various mobile device data for the device 110, including serial number, manufacturer, model, software version and wireless carrier (service provider) as shown by 404. The mobile application 102 then searches for API instruction sets located in the mobile application 102 that are might be applicable to unlocking the hotspot feature based on data collected in 404. In some instances, more than one set of API instructions is found. The mobile application 102 then executes one of the API instruction sets as shown in 408. The mobile device then determines whether the hotspot feature has been activated 410. If the hotspot feature is activated the process is complete 412. If the hotspot feature is not activated then the mobile application tries another set of API instructions, or if there are no more instruction sets to execute the application 102 prompts the user to try another process 414. The method demonstrated in process 400 uses only data stored on the mobile device by application 102.

Figure 5:
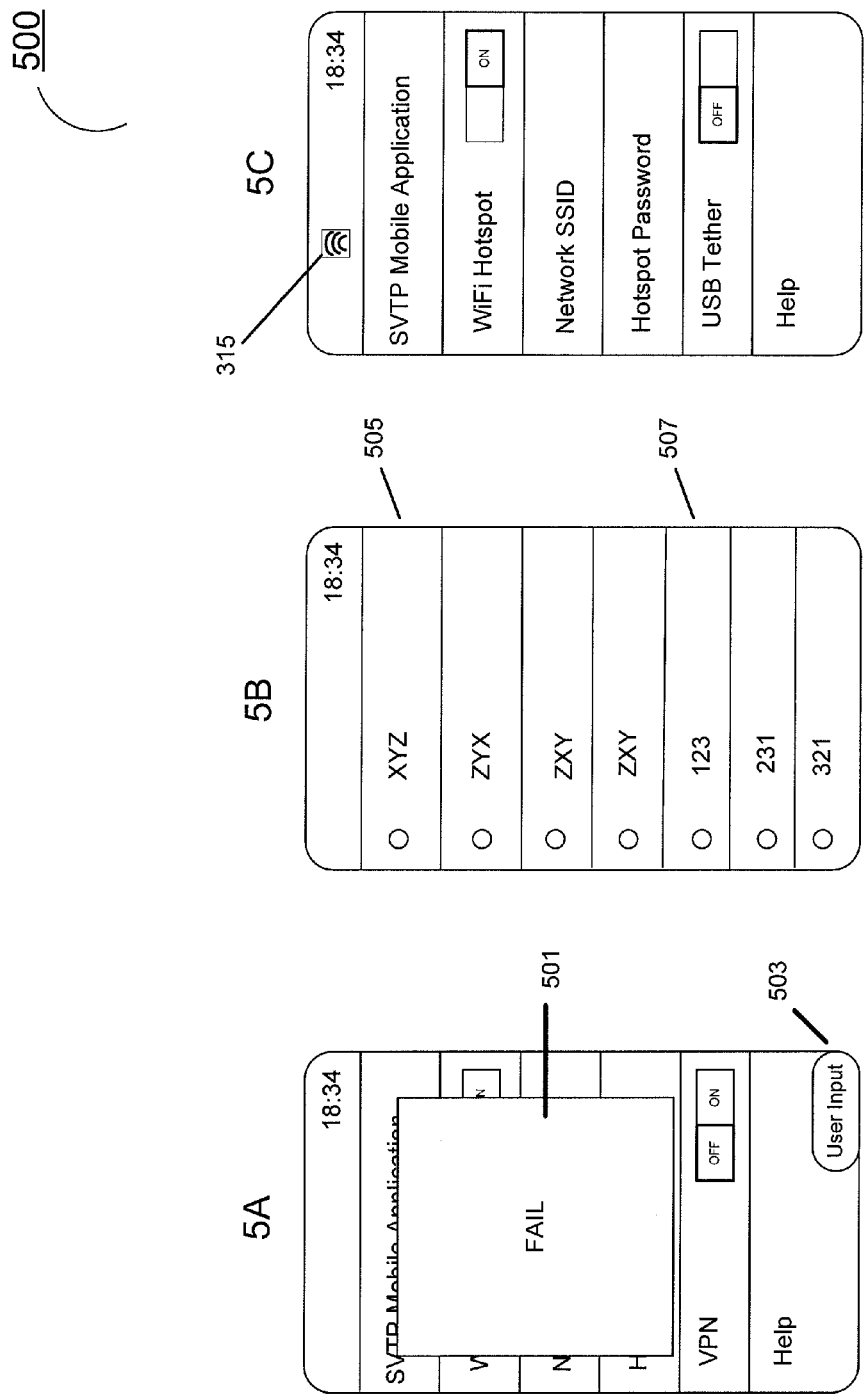
FIG. 5 represents mobile device screens according to an embodiment.

FIG. 5 is an illustration of process 500 according to an embodiment. Referring to FIG. 5, if the user is prompted to try another method (as in 414) a fail message 501 appears and the user is prompted for input 503 as shown in FIG. 5A. After the user touches the input button 503 a list of device manufacturers and service providers appear as in FIG. 5B. The lists shown in FIG. 5B contain radio buttons next to the selections which apply to the user's device. The user is prompted to select a device manufacturer 505 and a service provider 507. Based on the user input, mobile application 102 executes API instructions that are appropriate for the selection. The API instructions for this method are stored on the mobile device. If the instruction set executed based on the user input does not work the user will see the fail message 501 again, and have an opportunity to adjust their previous input by pressing the input button 503 again. This process can be repeated as many times as necessary. Once mobile application 102 is successful in unlocking the hotspot feature, a WiFi icon 315 will appear in the top left hand corner of the device screen as shown FIG. 5C. In an embodiment, process 500 is performed when process 400 fails to automatically produce the proper API instruction set.

Figure 6:
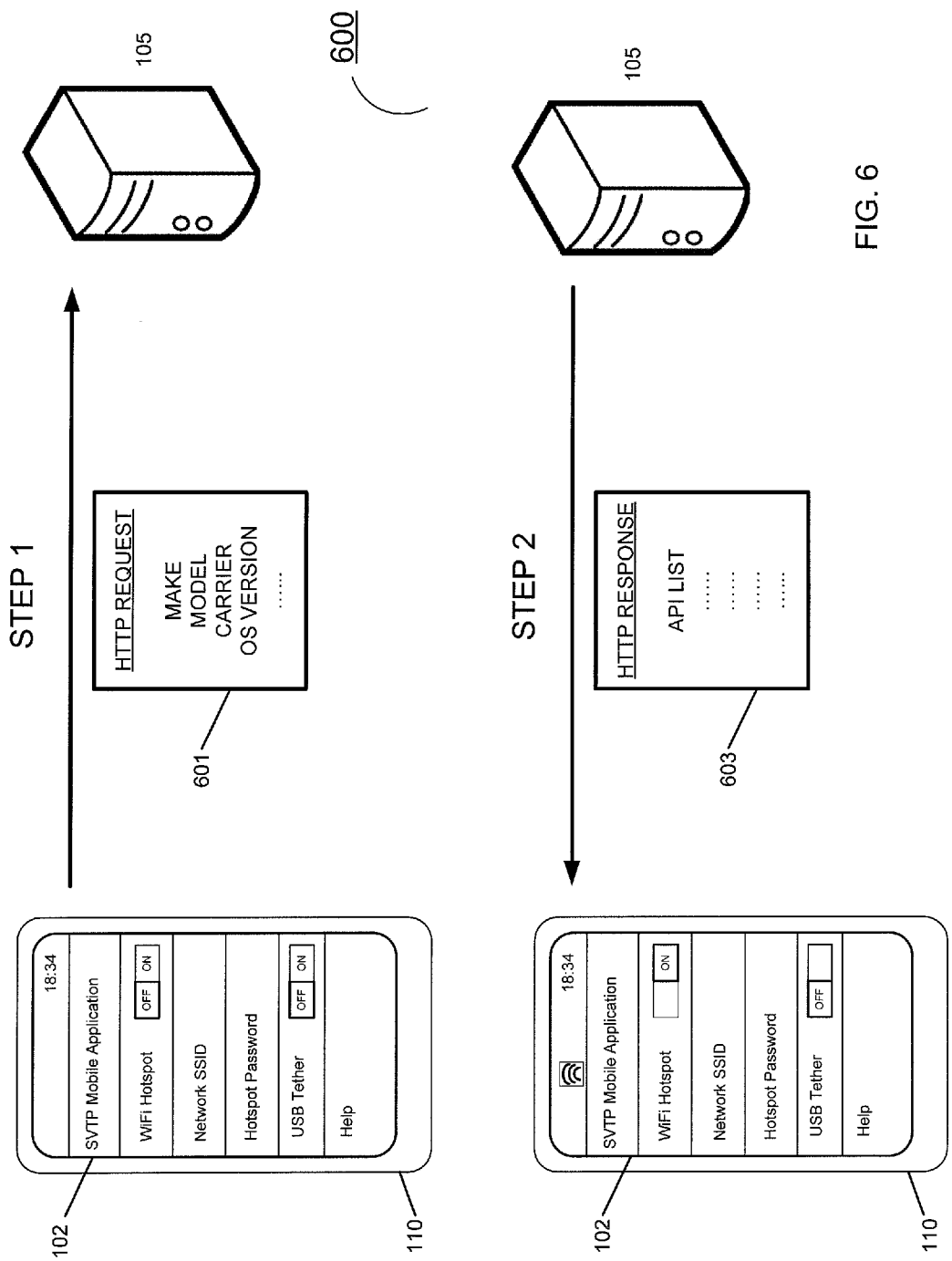
FIG. 6 is a block diagram illustrating communications between a mobile application and a server according to an embodiment.

When neither process 400 nor process 500 succeeds to unlock the hidden feature, the mobile application 102 resorts to another process 600, as described below. FIG. 6 is a diagram of the data exchange between the mobile application 102 and the mobile application servers 105 during process 600. Process 600 includes communicating with the mobile application databases 106 through the Internet 101. The mobile application 102 first collects various mobile device data for the device 110, including serial number, manufacturer, model, software version and wireless carrier (service provider) as shown by 404. The mobile application 102 then sends an HTTP Request 601, which contains the device data, to the mobile application servers 105 through the Internet 101. The mobile application server 105 then searches databases 106 for API instruction sets that might unlock the locked device feature. Any API instruction sets that are found are sent via an HTTP Response 603 back to the device 110 through the Internet 101. Mobile application 102 then executes the API instruction set provided in the HTTP Response 603. If the instruction set contained in HTTP Response 603 unlocks the hidden feature then the execution was successful. If the execution was not successful, a fail message (for example message 501) appears. At this point, the user can decide to use another process, or alternatively process 600 repeats until a HTTP Response 603 provides an appropriate instruction set.

Figure 7:
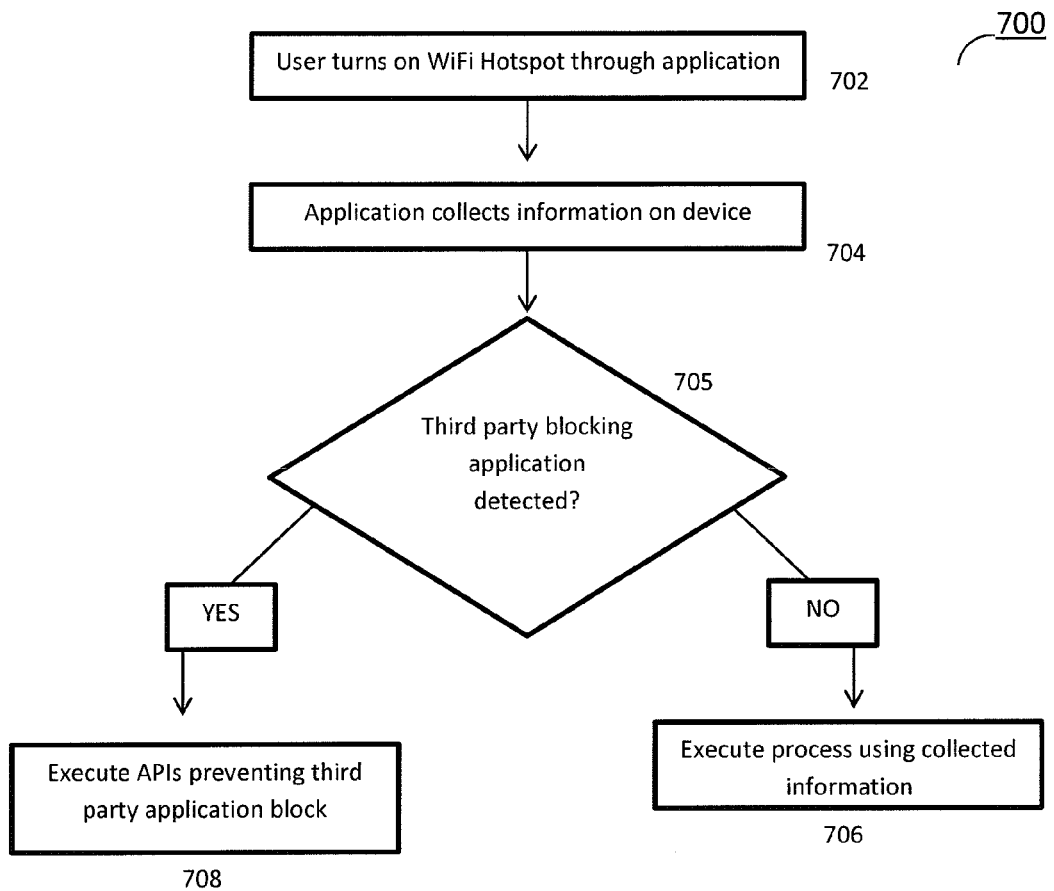
FIG. 7 is a flow diagram illustrating a method for accessing a wireless hotspot feature on a mobile device according to an embodiment.

FIG. 7 is a flow diagram of process 700 demonstrating how mobile application 102 addresses third party blocking applications. Third party blocking applications are directed to preventing software applications from performing functions on a device that might differ from some intended configuration. The user turns on mobile application 102 as shown by 702. The mobile application 102 then collects data including but not limited to the mobile device manufacturer, model, software version, installed third-party applications, and wireless carrier as shown by 704. If a third party feature blocking application is not detected, then mobile application 102 proceeds with another process for unlocking the hotspot feature. If a third party blocking application is detected, application 102 executes an API instruction set to disallow the third party application from preventing application 102 to unlock hidden features as shown in 708.

Figure 8:
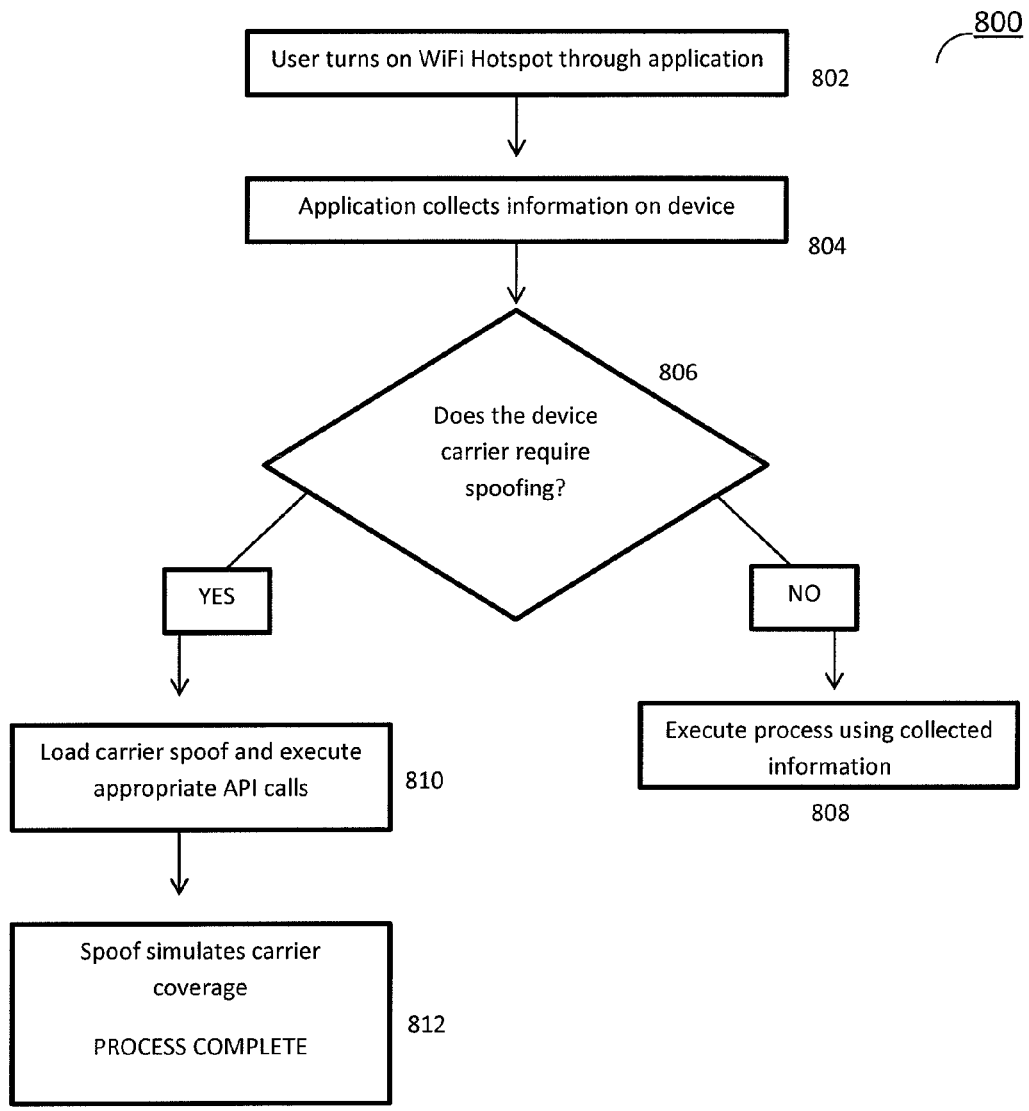
FIG. 8 is a flow diagram illustrating a method for accessing a wireless hotspot feature on a mobile device according to an embodiment.

In some instances the mobile device 102 has a feature which requires authentication by the service provider before the feature can be activated. When use of the hotspot feature requires authentication, the device communicates through Internet 101 to carrier servers 103 seeking authentication or permission to unlock use of the requested feature. This authentication is transparent to the user. Once the required authentication or permission is received the user of mobile device 102 has access to the hotspot settings shown in FIG. 2. FIG. 8 is a flow diagram of process 800 demonstrating how mobile application 102 handles service provider requirements for authentication or permission before using hidden features. The user turns on mobile application 102 as shown by 802. Mobile application 102 collects data on the device 110 as shown in 804. Mobile application 102 then assesses whether carrier permission is required to turn on the hotspot feature as shown in 806. If no carrier permission is required then application 102 proceeds with one of the above-described processes to unlock the hidden hotspot feature. If carrier permission is required, the application 102 loads the necessary carrier permission virtualization and executes the necessary API instruction to turn on the hotspot feature as shown in 810. If the device requires process 800 in order to obtain hotspot capability, process 800 is performed every time the application 102 is invoked.

The mobile application 102 uses one or more of the above mentioned processes to unlock the hidden feature. In an embodiment the mobile application 102 uses whatever method is most beneficial for the user and has the highest chance of success at any given time of operation. The mobile application 102 decides through a system of trial and error, and by analyzing mobile device data, which process is best to use at that time. This includes the mobile device application 102 communicating with mobile application servers 105 and/or using internal mobile application data. For example, if the user downloads mobile application 102 on to a device that fails to be unlocked with process 400, then the mobile application 102 uses process 500 or process 600 to unlock the hidden feature. For another example, if device data that is gathered by mobile application 102 shows that the device has low connectivity or bandwidth at this given time, mobile application 102 first executes process 400 and process 500 which do not require communication and HTTP exchanges with mobile application servers 105 to produce the API instruction sets required to unlock the hidden feature. Then if process 400 or process 500 does not work, mobile application 102 will execute process 600, no matter how long it takes with slow internet connectivity, to unlock hidden features. This benefits the user as the mobile application resorts to more bandwidth-consuming communication only when more economical methods fail.

As previously mentioned, the data regarding APIs and different devices is continually updated as different users use the mobile application 102 on different devices and with different carriers. Similarly, the methods as described are adaptive in that a set of heuristic IF-THEN rules are used to determine the appropriate sequence of API calls or instruction based on characteristics of the device. The success or failure of the various sequences of API calls causes the mobile application 102 to update its rules for choosing API sequences as it "learns" additional mobile device, software version, and service provider combinations.

What is claimed is:

1. A method for enabling a mobile device feature, the method comprising:
    collecting device information regarding the mobile device, the information comprising one or more of serial number, manufacturer, model designation, software version, and wireless communication service provider;
    based on the device information, searching for a set of instructions for enabling the mobile device feature, wherein the mobile device feature comprises a function performed by at least one of hardware and software of the mobile device, and wherein the feature comprises a function not available to a user of the mobile device as the mobile device was originally configured, and wherein the feature comprises a wireless communication hotspot feature;
    selecting a set of instructions from one or more search results;
    executing the selected set of instructions on the mobile device; and
    presenting a user interface on the mobile device, wherein the user interface accepts input from the user to enable the feature and perform the function wherein performing the function comprises configuring the mobile device to operate as a wireless communication hotspot.

2. The method of claim 1, wherein collecting the device information comprises acquiring the device information directly from the device.

3. The method of claim 1, wherein collecting the device formation comprises receiving user input via the user interface.

4. The method of claim 1, wherein searching for the set of instructions comprises comparing the device information to sets of instructions stored on the mobile device.

5. The method of claim 1, wherein searching for the set of instruction comprises comparing the device information with sets of instructions store remotely, and wherein the method further comprises downloading the set of instructions to the mobile device.

6. The method of claim 5, further comprising storing sets of instruction remote from the mobile device, and updating the stored sets of instructions continually.

7. The method of claim 1, further comprising:
    determining whether a third party application is responsible for disabling the mobile device feature; and
    executing instructions on the mobile device to disallow the third party application from disabling the mobile device feature.

8. The method of claim 1 further comprising:
    determining that execution of the selected set of instructions failed to enable the feature; and
    searching for an alternate set of instructions.

9. A system for wireless communication, the system comprising:
    a mobile device including wireless communication capabilities, including voice capabilities and data capabilities, wherein the mobile device is supplied by a manufacturer and wherein a service provider provides wireless communication service to a device user;
    a plurality of servers communicatively coupled to the mobile device, wherein the plurality of servers provide at least one mobile application to the mobile device for enabling features of the device that have been one or more of disabled, hidden, masked, blocked, and limited; and a plurality of databases coupled to the plurality of servers, wherein the plurality of databases store data related to the mobile device and a plurality of other mobile devices, the data comprising serial number, manufacturer, model designation, software version, and service provider, wherein the data is continually updated as the plurality of servers communicate with different mobile devices.

10. The system of claim 9, wherein the at least one mobile application finds and executes a set of application programming interface (API) calls that enable the feature.

11. The system of claim 10, wherein the feature comprises a wireless hotspot feature for configuring the mobile device to act as a wireless hotspot.

12. The system of claim 10, wherein the mobile device stores the at least one mobile application, and further stores at least one set of API calls that enable the feature.

13. The system of claim 10, wherein the at least one mobile application comprises a user interface for execution on the mobile device, wherein the user interface allows the user to control the feature.

14. A method for enabling a mobile device feature, the method comprising:
transmitting a mobile application to a mobile device, wherein the mobile application includes a user interface for enabling the feature on the mobile device;
receiving user input to enable the feature;
collecting device data comprising serial number, manufacturer, model designation, software version, and wireless communication service provider;
based on the device data and an identification of the feature to be enabled, searching on the device for a set of instructions to enable the feature;
selecting one of at least one set of instructions found during the search;
executing the selected set of instructions;
determining whether execution of the selected set of instructions enabled the feature;
if the execution did not enable the feature, selecting a different set of instructions.

15. The method of claim 14, further comprising:
executing the different, selected set of instructions; and
if the execution did not enable the feature, searching a remote database for at set of instructions.

16. The method of claim 15 further comprising updating one or more of the sets of instructions stored on the mobile device and the sets of instruction stored in the remote database based on execution results.

17. The method of claim 14, further comprising:
determining that the mobile device has one or more of low connectivity or low bandwidth; and
wherein selecting the set of instructions comprises selecting based on which method requires one of least connectivity and least bandwidth.

18. The method of claim 17, further comprising:
if execution of the selected set of instructions fails to enable the feature;
determining if another set of instruction is available that requires one of least connectivity and least bandwidth, and executing the set of instructions; and
otherwise, executing a set of instruction that requires one of relatively more connectivity and relatively more bandwidth.

19. The method of claim 14, further comprising:
if the execution did not enable the feature, determining whether a third party blocking application is disabling the feature;
searching for a set of instructions to prevent the third party blocking application from disabling the feature; and
executing the set of instructions to prevent the third party blocking application from disabling the feature.

20. A method for enabling a mobile device feature, the method comprising:
collecting device information regarding the mobile device, the information comprising one or more of serial number, manufacturer, model designation, software version, and wireless communication service provider;
based on the device information, searching for a set of instructions for enabling the mobile device feature wherein searching for the set of instructions comprises comparing the device information to sets of instructions stored on the mobile device, wherein the mobile device feature comprises a function performed by at least one of hardware and software of the mobile device, and wherein the feature comprises a function not available to a user of the mobile device as the mobile device was originally configured;
selecting a set of instructions from one or more search results;
executing the selected set of instructions on the mobile device; and
presenting a user interface on the mobile device, wherein the user interface accepts input from the user to enable the feature and perform the function.

21. A method for enabling a mobile device feature, the method comprising:
collecting device information regarding the mobile device, the information comprising one or more of serial number, manufacturer, model designation, software version, and wireless communication service provider;
based on the device information, searching for a set of instructions for enabling the mobile device feature, wherein searching for the set of instruction comprises comparing the device information with sets of instructions stored remotely, and wherein the mobile device feature comprises a function performed by at least one of hardware and software of the mobile device, and wherein the feature comprises a function not available to a user of the mobile device as the mobile device was originally configured;
selecting a set of instructions from one or more search results;
downloading the set of instructions to the mobile device;
executing the selected set of instructions on the mobile device; and
presenting a user interface on the mobile device, wherein the user interface accepts input from the user to enable the feature and perform the function.

22. A method for enabling a mobile device feature, the method comprising:
collecting device information regarding the mobile device, the information comprising one or more of serial number, manufacturer, model designation, software version, and wireless communication service provider;
based on the device information, searching for a set of instructions for enabling the mobile device feature, wherein searching for the set of instruction comprises comparing the device information with sets of instructions store remotely, and wherein the mobile device feature comprises a function performed by at least one of hardware and software of the mobile device, and wherein the feature comprises a function not available to a user of the mobile device as the mobile device was originally configured;

selecting a set of instructions from one or more search results;

downloading the set of instructions to the mobile device;

executing the selected set of instructions on the mobile device;

presenting a user interface on the mobile device, wherein the user interface accepts input from the user to enable the feature and perform the function; and storing sets of instruction remote from the mobile device, and updating the stored sets of instructions continually.

23. A method for enabling a mobile device feature, the method comprising:

collecting device information regarding the mobile device, the information comprising one or more of serial number, manufacturer, model designation, software version, and wireless communication service provider;

based on the device information, searching for a set of instructions for enabling the mobile device feature, wherein the mobile device feature comprises a function performed by at least one of hardware and software of the mobile device, and wherein the feature comprises a function not available to a user of the mobile device as the mobile device was originally configured;

determining whether a third party application is responsible for disabling the mobile device feature;

executing instructions on the mobile device to disallow the third party application from disabling the mobile device feature;

selecting a set of instructions from one or more search results;

executing the selected set of instructions on the mobile device; and presenting a user interface on the mobile device, wherein the user interface accepts input from the user to enable the feature and perform the function.

24. A method for enabling a mobile device feature, the method comprising:

collecting device information regarding the mobile device, the information comprising one or more of serial number, manufacturer, model designation, software version, and wireless communication service provider;

based on the device information, searching for a set of instructions for enabling the mobile device feature, wherein the mobile device feature comprises a function performed by at least one of hardware and software of the mobile device, and wherein the feature comprises a function not available to a user of the mobile device as the mobile device was originally configured;

selecting a set of instructions from one or more search results;

executing the selected set of instructions on the mobile device;

determining that execution of the selected set of instructions failed to enable the feature;

searching for an alternate set of instructions; and presenting a user interface on the mobile device, wherein the user interface accepts input from the user to enable the feature and perform the function.

* * * * *